Aug. 3, 1937.  E. J. VON HENKE  2,088,936
ELECTRODE
Filed May 9, 1936
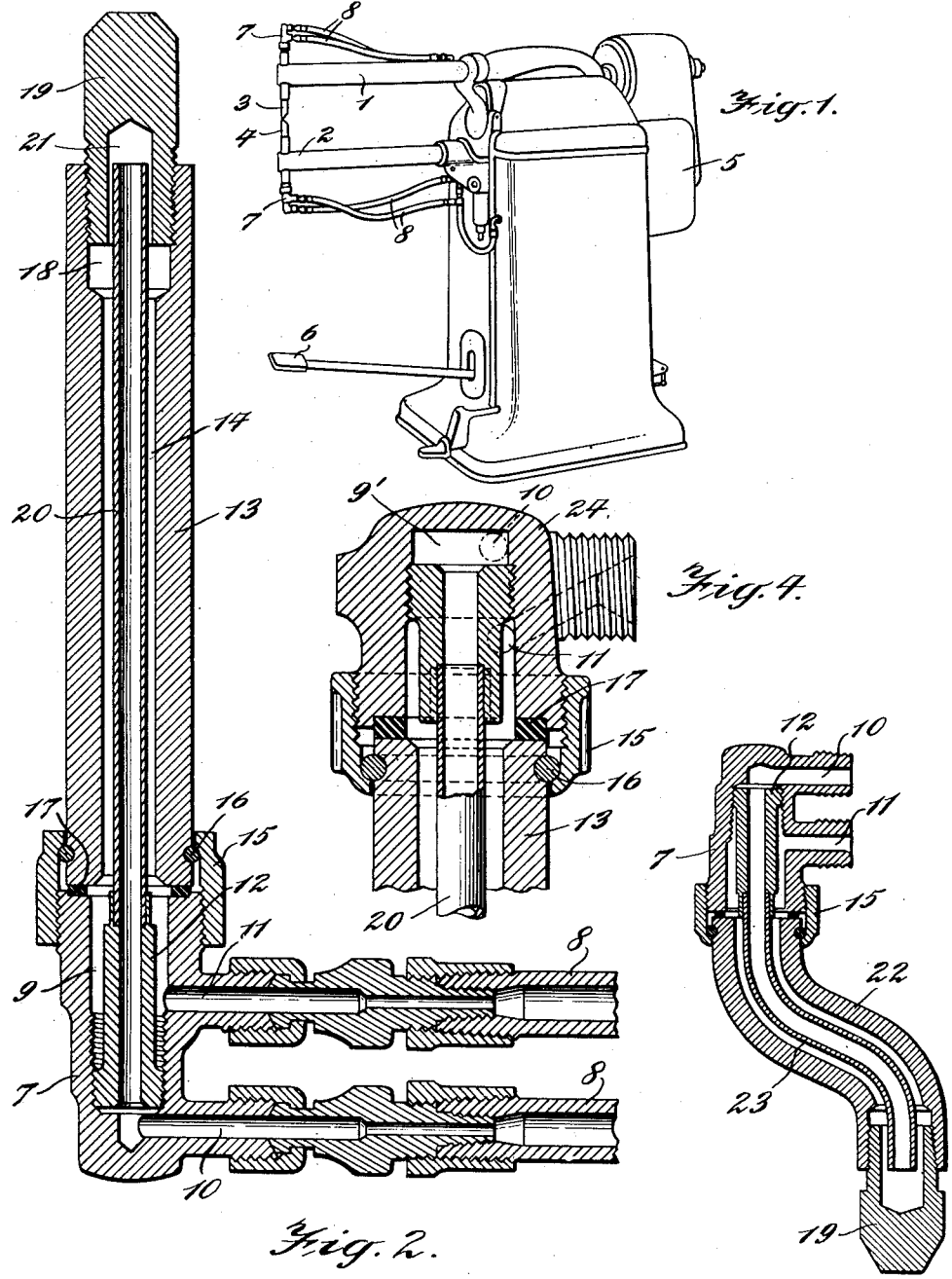
Edmund J. Von Henke INVENTOR.
BY Gifford, Scull & Burgess
ATTORNEYS.

Patented Aug. 3, 1937

2,088,936

UNITED STATES PATENT OFFICE 2,088,936

ELECTRODE

Edmund J. von Henke, Chicago, Ill., assignor to American Electric Fusion Corporation, Chicago, Ill., a corporation of Illinois Application May 9, 1936, Serial No. 78,743

1 Claim. (Cl. 219—4)

This invention relates to a novel and improved form of electrode, the novel features of which will be best understood from the following description and the annexed drawing, in which I have shown selected embodiments of the invention and in which:

Fig. 1 is a perspective view of a welding machine with which the invention may be used;

Fig. 2 is a longitudinal section through the electrode;

Fig. 3 is a view similar to Fig. 2 but on a smaller scale and showing a different embodiment of the invention;

Fig. 4 is a view on an enlarged scale showing another embodiment of the invention.

The construction of the electrode forming the subject matter of this application is one designed primarily to permit ready cooling of the electrode and particularly of its tip, and also to permit ready change from one form of electrode to another, according to the requirements of the work being performed.

The apparatus shown in Fig. 1 comprises horns 1 and 2 to which are secured electrodes 3 and 4 which are brought into contact with opposite sides of the work, either by a motor drive 5 or by a treadle 6, all in a manner known in the art. Each electrode, according to my invention, is provided with a head 7 to which a cooling fluid, such as water, may be supplied through hose 8.

Referring now more particularly to Fig. 2, it will be seen that the head is provided with a chamber 9 extending lengthwise thereof, and that this chamber is in communication with the hose 8 through two circulation connections 10 and 11. The wall of the chamber between these connections is threaded as shown, and a fitting 12 has threaded engagement with this part of the wall, serving as a partition to divide the chamber, extending across the chamber between the two connections 10 and 11.

Secured to the head is a body 13 tubular in form and having a central bore 14 forming a substantial continuation of the chamber 9 when the parts are secured together. The body may be secured to the head as by a sleeve 15 threaded on the head and engaging a wire 16 received in a peripheral groove in the outer surface of the body. A washer 17 may be interposed between the body and the head to insure a tight fit therebetween.

The end of the bore 14 remote from the chamber is enlarged as indicated at 18, and is threaded interiorly as shown, to engage corresponding threads on the outer surface of a welding tip 19.

Secured to the fitting 12 is a tube 20, preferably arranged concentrically in the bore 14 and spaced from the walls thereof. One end of the tube is secured to the fitting as indicated, which may be done by sweating or any other suitable means, and its opposite end extends well into the tip 19, being disposed in a recess 21 in the tip but spaced from the walls of that recess.

By the above arrangement it will be seen that water or other cooling fluid may enter through the connection 10 and thus pass through the tube 20 directly to the welding tip 19 and then return through the bore 14 on the outside of the tube 20 and out through the connection 11. If preferred, this direction of flow may be reversed, but preferably the connection 10 is used as the intake and the connection 11 as the outlet.

It will be seen that the cooling fluid is supplied directly to the welding tip through the tube 20 and that the heat transmitted to the fluid may be easily and readily conducted away by the contact of the returning fluid with the wall of the bore 14 in the body 13. Moreover, by placing the tip inside the bore, the cooling fluid comes directly in contact with a large area of the tip and thus the heat will be rapidly conducted away directly by the cooling fluid. Likewise, the welding tip has an extended thermal contact with the body through the threaded connection therewith, and heat is rapidly conducted to the body from the tip through this connection.

The arrangement of the fitting having threaded engagement with the chamber wall between the two connections 10 and 11 is of advantage particularly in connection with the detachable connection between the head and the body. Whenever it is desired to change the character of the electrode, for example when the character of the work being welded is changed, the body can be readily disconnected by loosening the sleeve 15 and then the tube may be taken out by turning it with the fitting to which it is secured. Then a new body may be supplied to the head having a tube with a fitting adapted for use with that body. The parts are assembled by placing the new tube with its fitting in place first and then the body may be connected to the head. On the other hand, where the body of the electrode has some such shape as that shown at 22 in Fig. 3, the tube 23 with its fitting 12 may be assembled together with the body. The fitting is secured in place first and then the body is secured to the head.

In Fig. 4 is shown a modified form of head 24 in which the connections 10 and 11 are disposed one behind the other or transversely of the chamber 9' instead of lengthwise thereof. Otherwise, this form of the invention follows closely that already described and further detail description thereof is deemed unnecessary.

While I have shown the invention as embodied in specific forms, it is to be understood that various changes in details may be made without departing from the scope of the invention, as defined by the appended claim.

I claim:

A welding electrode comprising a head having a chamber therein and two circulation connections communicating with said chamber at spaced points, a tubular body secured to said head and having a central bore communicating at one end with said chamber, a welding tip secured to the body at the other end of said bore, a fitting threaded to the wall of said chamber between said connections and forming a partition across the chamber, and a tube disposed within said bore and spaced from the wall thereof, said tube being secured at one end to said fitting in line with a hole extending through said fitting, the other end of the tube extending adjacent said tip but spaced therefrom.

EDMUND J. VON HENKE.